United States Patent [19]

van Dijk et al.

[11] Patent Number: 5,338,413
[45] Date of Patent: Aug. 16, 1994

[54] METHOD FOR THE PREPARATION OF A POLYMERIC SHAPED ARTICLE CONTAINING AN ELECTRICALLY CONDUCTIVE POLYMER

[75] Inventors: Hans K. van Dijk, Geleen; Ronald M. A. M. Schellekens, Meerssen, both of Netherlands

[73] Assignee: DSM N.V., Heerlen, Netherlands

[21] Appl. No.: 91,715

[22] Filed: Jul. 15, 1993

[30] Foreign Application Priority Data

Jul. 15, 1992 [NL] Netherlands ............... 9201274

[51] Int. Cl.$^5$ .................. C25B 3/02; C25D 11/32
[52] U.S. Cl. ......................... 204/59 R; 205/77; 205/138; 205/235; 252/500; 252/511
[58] Field of Search ............ 204/59 R; 252/500, 511; 205/77, 138, 235

[56] References Cited

U.S. PATENT DOCUMENTS 4,468,291  8/1984  Naarmann et al. ........... 204/59 R
4,749,451  6/1988  Naarmann ..................... 204/59 R

FOREIGN PATENT DOCUMENTS 0142089  5/1985  European Pat. Off. .
0234467  9/1987  European Pat. Off. .
0378279  7/1990  European Pat. Off. .

*Primary Examiner*—Paul R. Michl
*Assistant Examiner*—Tae H. Yoon
*Attorney, Agent, or Firm*—Cushman, Darby & Cushman

[57] ABSTRACT

Method for the preparation of a polymeric shaped article containing an electrically conductive polymer wherein a base shaped article possessing electrically conductive properties is moved along an anode, at least part of the article being in contact with the anode, in the presence of an electrolyte-containing medium containing monomer units, which on polymerization form an electrically conductive polymer and wherein a voltage is applied between the anode and a second electrode which is in contact with the electrolyte-containing medium. It has appeared that, in the method according to the invention, the shaped article does not adhere to the electrode so that the method may be practiced continuously. A further advantage of the shaped article failing to adhere to the electrode is that the method according to the invention generates very little waste. Furthermore, it has appeared that the method according to the invention allows a shaped article to be produced with a very short polymerization time, the electrically conductive polymer in which being homogeneously distributed. The applied base shaped article does not swell during wetting, so that the mechanical properties of the base shaped article do not deteriorate. As a result, if the method is applied, for instance, continuously, a higher rate of production can be applied.

16 Claims, 1 Drawing Sheet

METHOD FOR THE PREPARATION OF A POLYMERIC SHAPED ARTICLE CONTAINING AN ELECTRICALLY CONDUCTIVE POLYMER

FIELD OF THE INVENTION

The invention relates to a method for the preparation of a polymeric shaped article containing an electrically conductive polymer, wherein a base shaped article containing a matrix polymer is contacted with an anode in the presence of an electrolyte-containing medium containing monomer units, which on polymerisation form an electrically conductive polymer, and wherein a voltage is applied between the anode and a second electrode which is in contact with the electrolyte-containing medium.

BACKGROUND OF THE INVENTION

A similar method is described by O. Niwa et al. in Makromol. Chem., Rapid Commun. 6, No. 6, 1985, pp. 375–379. According to the method described therein, an insulating polymeric base film has been applied to an anode, which is placed in an electrolyte solution also containing pyrrole. As a result of an applied voltage, the pyrrole monomers diffuse from the electrolyte solution to the base film, where they polymerise to form polypyrrole. In this way, a film with electrically conductive properties is obtained. The pyrrole monomers polymerise both on and within the base film.

The method described by O. Niwa et al. is suitable for the preparation of a polymeric shaped article with electrically conducting properties. The method of Niwa has the disadvantage of being uneconomically low in productivity. Firstly, only a relatively small piece of base film, essentially having the same size as the anode, can be applied at a time. Further, the application of the base film onto the anode is time-consuming since a very intimate contact over the whole of the surface is required. Then the process of making the film conductive is dominated by the intrinsically slow diffusion of the pyrrole through the film and finally the conductive film has to be peeled off from the anode on the risk of damaging the film, that tends to stick to the anode.

A further disadvantage is that the base shaped article applied by Niwa swells in the electrolyte solution, so causing the mechanical properties of the base shaped article to deteriorate and making the film stick to the anode. Another added disadvantage of the base shaped article applied by Niwa is that a high voltage needs to be applied in order to realise a short polymerisation time or a high rate of production.

SUMMARY AND OBJECTS OF THE PRESENT INVENTION

The present invention aims to provide a method that does not have the disadvantages set out above. The method according to the invention is characterised in that the applied base shaped article possesses electrically conducting properties and that the contact between the shaped article and the anode is established by moving the article along the anode, at least part of the article being in contact with the anode.

The method according to the invention allows a highly conductive film to be obtained at a high production rate in a continuous process. Contacting times of only minutes have appeared to be sufficient for obtaining a highly conductive article. No sticking of the film to the electrode occurs, thus waste being avoided.

A further advantage of the shaped article failing to adhere to the electrode is that the method generates very little waste. Furthermore, it has appeared that the method according to the invention allows a shaped article to be produced with a very short polymerisation time, wherein the electrically conductive polymer is homogeneously distributed. The applied base shaped article does not swell during wetting, so that the mechanical properties of the base shaped article do not deteriorate. As a result, if the method is applied, for instance, continuously, a higher production rate can be applied.

From according to EPO 234,467 it is known to apply electrochemically an electrically conductive polymer to a base film already possessing conductive properties, but just as in the Niwa reference a batch process is used. The problem to be solved in the EPO 234,467 lies in the thickness of the base film. Any increase in productivity is not achieved and contacting times of hours are still required.

The shaped article so obtained is highly suited for EMI shielding. Examples of objects that need EMI shielding are computers and telephones.

DETAILED DESCRIPTION OF THE INVENTION

Figure 1:
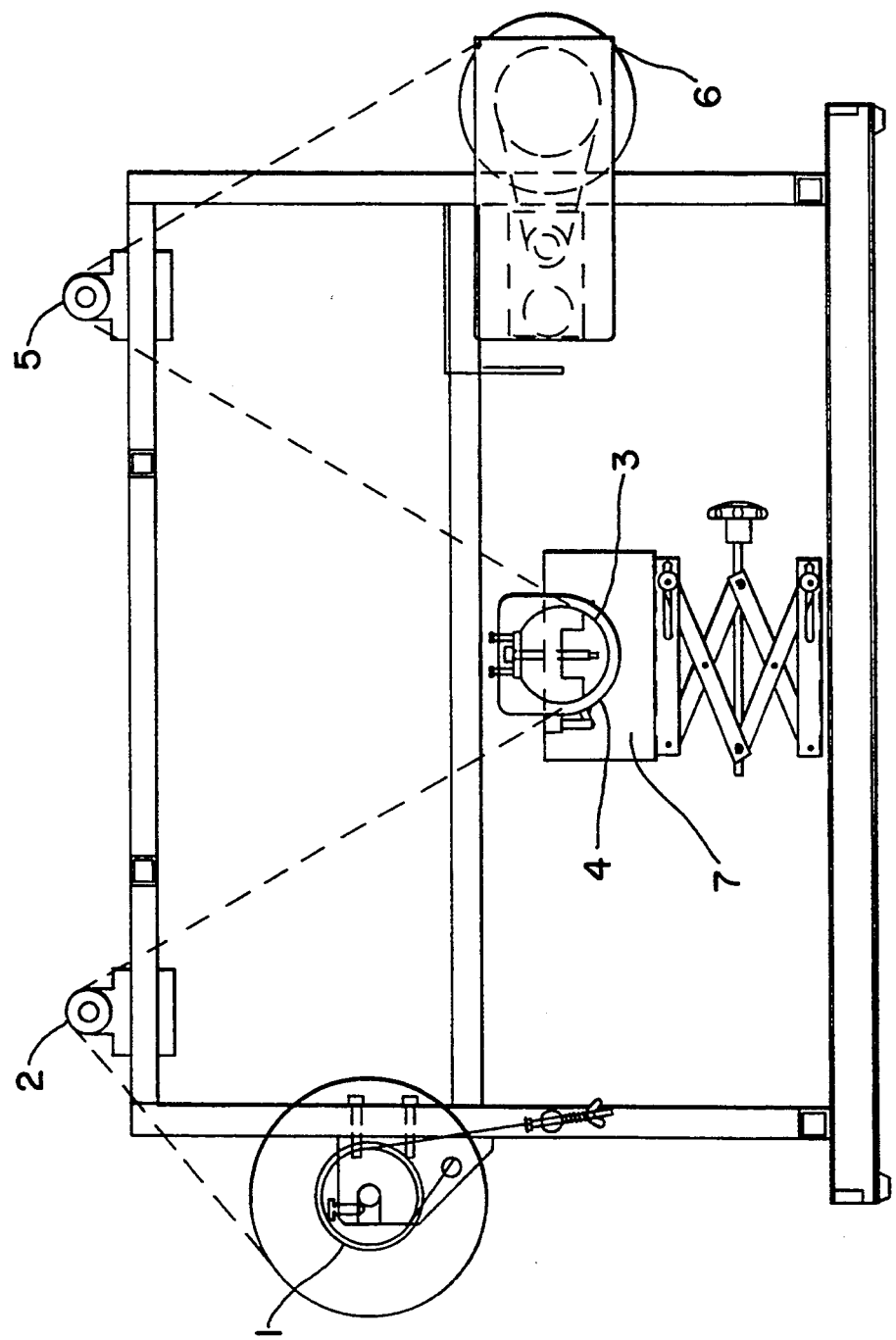
FIG. 1 schematically represents a device for practicing the method according to the present invention.

The polymeric base shaped article applied in the method according to the invention possesses electrically conducting properties. The electrically conducting properties are obtained, for instance, by incorporating an electrically conductive polymer in the polymeric base shaped article. The polymeric base shaped article contains a matrix polymer also. Depending on the requirements for the polymeric base shaped article in terms of, for instance, the mechanical properties, any polymer may in principle be selected. Thermoplastic polymers are eminently suitable as matrix polymer because of their processability. Suitable thermoplastic polymers are, for instance, polyvinyl chloride or copolymers of vinyl chloride and other vinyl monomers, polyvinylidene fluoride or copolymers of vinylidene fluoride and other vinyl monomers, polystyrene or copolymers of styrene and other monomers for instance maleic anydride and maleimide, polyacrylates or copolymers of an acrylate with other monomers, polyvinyl carbazole, polyolefins such as polyethylene, ultra-high weight polyethylene (UHMWPWE) and and polypropylene, polyvinyl acetate, polyvinyl alcohol, polyesters for instance polyethylene terephthalate and polybutylene terephthalate, polycarbonates, polyetherimides, polyimides, polyamides, polyamide imides, polyethylene oxide, polybutadiene rubbers, polytetrafluoroethylene and the like. If desired, a mixture of several polymers may be used as thermoplastic polymer. Ultra-high molecular weight polyethylene is preferably used as matrix polymer because of its good mechanical properties.

The applied polymeric base shaped article possesses electrically conducting properties. The specific conductivity of the applied polymeric base shaped article is preferably greater than 0.001 S/cm. More preferably, the specific conductivity is greater than 0.1 S/cm. For the purposes of the present invention a shaped article is understood to be, for instance, a film, a fibre, a board or other object. The thickness of the applied polymeric base shaped article usually lies between 5 $\mu$m and 1 mm but preferably between 10 $\mu$m and 300 $\mu$m. The applied polymeric base shaped article is preferably porous, at least a proportion of the pores preferably being accessible from the outside surface of the shaped article. The volume porosity of the applied base shaped article is usually greater than 30%, more preferably greater than 50% and even more preferably greater than 65%. Porous films containing a thermoplastic matrix polymer are described in EP-A-105629, EP-A-309136, EP-A-288021 and WO-A-86/02282. Films containing a polyolefin as matrix polymer are described in, for instance, EP-A-193318. Films containing an ultra-high molecular weight polyethylene as matrix polymer are described in, for instance, EP-A-378279 and EP-A-163424.

These films as such do not possess electrically conductive properties. They can be made electrically conductive for instance by impregnating them with a solution of a monomer, polymerisable to a conductive polymer and contacting the impregnated film with a catalyst to form a conductive polymer inside the film. Also the mirror process is feasible, wherein the film is impregnated with a solution of a catalyst and subsequently exposed to for instance a vapour of a monomer, polymerisable to a conductive polymer. A preferred method is to impregnate the film with a solution containing of a precursor monomer and a catalyst together and activating the precursor monomer to have a conductive polymer formed in situ. A precursor monomer is to be understood to be a monomer blocked with a substituting group on a position taking part in the polymerisation, the substituting group being easily removable to obtain the corresponding reactable monomer.

The electrically conductive polymer in the polymeric base shaped article is made up of monomer units chosen from, for instance, the group formed by pyrrole, thiophene, indole, carbazole, furan, aniline, isothianaphthene, acetylene and derivatives of these monomers. Given the level and stability of the electrically conducting properties, an electrically conductive polymer is to be preferred that is made up of pyrrole units, thiophene units and/or aniline units. If desired, the electrically conductive polymer is made up of a mixture of several of the above-mentioned monomer units.

The electrolyte-containing medium usually contains a solvent. The solvent is often selected from the group formed by water, aromatic compounds for instance benzene, toluene and xylene, alcohols for instance methanol and ethanol, hydrocarbons for instance pentane and hexane, ethers for instance dioxane, diethyl ether, ethyl-methyl ether and tetrahydrofuran, ketones for instance acetone, diethyl ketone and methyl-ethyl ketone, halogenated compounds for instance $CHCl_3$, $CH_2Cl_2$, $CH_3Cl$ and carbon tetrachloride, esters such as ethyl formiate and ethyl acetate, and compounds for instance acetonitrile, nitromethane, dimethyl sulfoxide, dimethyl formamide, triethyl phosphate, dimethyl acetamide and pyridine. A mixture of several solvents may be used also. Preferably, an aprotic, non-nucleophilic solvent is applied.

Common and known ionic or ionizable compounds may be used as electrolyte. Suitable electrolytes contain, for instance, anions of strong, oxidizing acids, or aromatics with acid groups which, if desired, may be substituted with alkyl groups and/or nitro groups. Highly suitable electrolytes contain as cations an alkali metal cation such as $Li^+$, $Na^+$ or $K^+$, an $NO^+$ or $NO_2^+$ cation or an —onium cation of, for instance, nitrogen such as $R_4N^+$ or of phosphorus, such as $R_4P^+$. The R groups in the —onium cations are selected independently of each other from the group formed by hydrogen, alkyl groups with 1-6 carbon atoms, cycloaliphatic groups with 6-14 carbon atoms and aromatic groups with 6-14 carbon atoms. Examples of such —onium cations are tetramethyl ammonium cations, tetraethyl ammonium cations, tri-n-butyl ammonium cations, tetra-n-butyl ammonium cations, triphenyl phosphonium cations and tri-n-butyl phosphonium cations. Highly suitable electrolytes contain as anion for instance $BF_4-$, $AsF_4-$, $AsF_6-$, $SbF_6-$, $SbCl_6-$, $PF_6-$, $ClO_4-$, $HSO_4-$ or $SO_4^{2-}$ groups. In addition, anions of aromatic compounds with acid groups are especially suitable to be used. Examples of such anions are the $C_6H_5COO-$ group and anions of sulphonic acid groups, which, if desired, are substituted with alkyl groups such as the benzene sulphonate anion and the tosylate anion. As well as anions of aromatic compounds with acid groups, anions of aromatic compounds with nitro groups are especially suitable to be used. Examples of such electrolytes are salts of nitrophenol, of aromatic carboxylic acids substituted with nitro-groups, and of aromatic sulphonic acids substituted with nitro-groups. The electrolyte concentration in the medium usually lies between 0.001 and 1 mole per liter but preferably between 0.01 and 0.1 mole per liter.

The electrolyte-containing medium also contains monomer units. These monomer units are chosen from, for instance, the group formed by pyrrole, thiophene, indole, carbazole, furan, aniline, isothianaphthene, acetylene and derivatives of these monomers. The electrolyte-containing medium may optionally contain a mixture of several of the above-mentioned monomer units. Examples of derivatives of these monomers are N-methyl pyrrole, N-ethyl pyrrole, N-propyl pyrrole, N-n-butyl pyrrole, N-phenyl pyrrole, N-tolyl pyrrole, N-naphthyl pyrrole, 3-methyl pyrrole, 3,4-dimethyl pyrrole, 3-ethyl pyrrole, 3-n-propyl pyrrole, 3-n-butyl pyrrole, 3-phenyl pyrrole, 3-tolyl pyrrole, 3-naphthyl pyrrole, 3-methoxypyrrole, 3,4-dimethoxypyrrole, 3-ethoxypyrrole, 3-n-propoxypyrrole, 3-phenoxypyrrole, 3-methyl-N-methyl pyrrole, 3-methoxy-N-methyl pyrrole, 3-chloropyrrole, 3-bromopyrrole, 3-methyl thiopyrrole, 3-methylthio-N-methyl pyrrole, 2,2'-bithiophene, 3-methyl-2,2'-bithiophene, 3,3'dimethyl-2,2'-bithiophene, 3,4-dimethyl-2,2'-bithiophene, 3,4-dimethyl-3',4'-dimethyl-2,2'-bithiophene, 3-methoxy-2,2'-bithiophene, 3,3'-dimethoxy-2,2'-bithiophene, 2,2',5,2''-terthiophene, 3-3,3-dimethyl-2,2',5'2'''-terthiophene, 2-cyclohexyl aniline, aniline, 4-propanoyl aniline, 2-(methyl-amino)aniline, 2-(dimethyl amine)aniline, o-toluidine, 4-carboxyaniline, N-methyl aniline, m-hexyl aniline, 2-methyl-4-methoxy carbonyl aniline, N-propyl aniline, N-hexyl aniline, m-toluidine, o-ethyl aniline, m-ethyl aniline, o-ethoxy aniline, m-butyl aniline, 5-chloro-2-ethoxy aniline, m-octyl aniline, 4-bromoaniline, 2-bromoaniline, 3-bromoaniline, 3-acetamidoaniline, 4-acetamidoaniline, 5-chloro-2-methoxyaniline, 2-acetyl aniline, 2,5-dimethyl aniline, 2,3-dimethyl aniline, 4-benzyl aniline, 4-amino aniline, 2-methyl thiomethyl aniline, 4-(2,4-dimethyl phenyl)aniline, 2-ethyl thioaniline, n-methyl-2,4-dimethyl aniline, n-propyl-m-toluidine, n-methyl-o-cyanoaniline, 2,5-dibutyl aniline, 2,5-dimethoxyaniline, o-cyanoaniline, tetrahydronaphthyl amine, 3-(n-butyl sulphonic acid)aniline, 2-thiomethyl aniline, 2,5-dichloroaniline, 2,4-dimethoxyaniline, 3-propoxymethylaniline, 4-mercaptoaniline, 4-methyl thioaniline, 3-phenoxy aniline, 4-phenoxy aniline, n-hexyl-m-toluidine, 4-phenyl thioaniline, n-octyl-m-toluidine and 4-trimethylsilyl aniline. The concentration of the monomer units in the electrolyte-containing medium usually lies between 0.01 and 1 mole per liter but preferably between 0.1 and 0.3 mole per liter. The temperature of the electrolyte-containing medium usually lies between 0° and 100° C. but preferably between 10° and 40° C.

The electrodes employed in the method according to the invention are selected from the commonly used electrodes. Such electrodes contain, for instance, platinum, gold, silver, palladium, titanium, chromium-nickel or stainless steel. Indium-tin oxide-coated electrodes may be employed also. Preferably, use is made of platinum electrodes.

Electrochemical set-ups in which the method according to the invention may be applied are described in, for instance, EPO 142,089 and EPO 99,055. In the method according to the invention, one of the electrodes referred to above functions as an anode. The polymeric base shaped article possessing electrically conducting properties is brought into contact with the anode. To this end, the base shaped article may be sliding along the anode or fixed to the anode. Preferably, a method is used whereby a very long base shaped article is continuously slided along the anode. The continuous method makes it possible to produce a shaped article whose electrically conducting properties are homogeneously distributed over the shaped article. It is especially advantageous to pass the base shaped article along the anode so that there is hardly any electrolyte-containing medium between the anode and the shaped article. The contact time, during which the base shaped article is contacted with the electrolyte-containing medium, usually lies between 0.1 and 20 minutes. The contact time preferably lies between 0.1 and 5 minutes. If desired, the method according to the invention is repeated several times. In a special embodiment a base shaped article is slided along a first, cylindrical electrode, in which process one side is contacted with the electrolyte-containing medium, and subsequently along a second, cylindrical electrode, in which process the other side is contacted with the electrolyte-containing medium. In the method according to the invention, the current density between the anode and the other electrode, the cathode, is usually 5–20 mA/cm$^2$.

The shaped article produced by the method according to the invention usually contains 5–95 percent by weight electrically conductive polymer, calculated relative to the total weight of matrix polymer and electrically conductive polymer. Preferably, this is 25–85 percent by weight. The specific conductivity of the produced shaped article usually is greater than 10 S/cm, preferably greater than 50 S/cm. The electrically conducting properties of the shaped article produced by the method according to the invention are measured. To this end, the specific conductivity, for instance, is measured by the so-called four-point method. This method is briefly described in EPO 314,311. A more detailed description is to be found in H. H. Wider, Laboratory Notes on Electrical and Galvanomagnetic Measurements, Elsevier, New York, 1979. The specific conductivity is measured by this method:

$$\sigma = (L/A)*(1/R),$$

where $\sigma$ = specific conductivity [S/cm]
L = distance between the two inner electrodes [cm]
R = resistance [ohm]
A = cross-sectional area The base shaped article applied in the method according to the invention may optionally contain up to 60 percent by volume fillers and/or antioxidants. Examples of fillers that may be added are talc, fibres, pigments, kaolin, wollastonite and glass.

If desired, low-molecular components and impurities, if any, may be removed from the shaped article obtained by the method according to the invention by extraction and/or evaporation. These methods are commonly known.

The invention is elucidated by the following examples without being limited thereto.

EXAMPLES AND COMPARATIVE EXPERIMENTS

EXAMPLE I

A porous UHMW-PE film (length 40 meters; width 8.5 cm; thickness 35 μm; volume porosity 83%) was impregnated with a solution of 4 grams pyrrole-2-carboxylic acid and 11.2 grams FeCl$_3$ in a mixture of 36 ml tetrahydrofuran and 60 ml methanol. The impregnated film was rolled onto a reel and heated to a temperature of 100° C. for 15 minutes. After extraction, a base film was obtained with a specific conductivity of 0.2 S/cm.

FIG. 1 is a schematic representation of a device by means of which the method according to the invention may be applied. The base film obtained was placed in the device according to FIG. 1. To this end, the base film was placed on a take-off reel 1, passed along a guide pulley 2 and between an anode 3 and a cathode 4 and a guide pulley 5 and attached to a take-up reel 6. A cathode reservoir 7 was filled with 180 ml of a solution of 4.8 grams p-toluene sulphonic acid, 3.3 ml pyrrole and 2.5 ml water in 250 ml acetonitrile. The length of the applied anode (3) was 10 cm. The rate of travel of the base film was 5.4 cm/minute, resulting in a contact time, during which the base film was wetted with the electrolyte solution, of approximately 110 seconds.

Electrolysis was effected at a current density between the anode and the cathode of 14.1 mA/cm$^2$. A good, homogeneous polypyrrole coating was deposited on the base film. The specific conductivity of the resultant, smooth film was 30 S/cm.

EXAMPLE II

A conductive base film produced analogously to Example I was continuously passed along the anode at a speed of 1.8 cm/minute, the conditions being equal to those in Example I. The specific conductivity of the film so produced was 70 S/cm.

COMPARATIVE EXPERIMENT A

Example II was repeated except that a non-conductive UHMW-PE base film (length 40 meters; width 8.5 cm; thickness 35 μm; porosity 83%) was passed along the anode. The film so produced was not electrically conductive.

COMPARATIVE EXPERIMENT B

Comparative experiment A was repeated except that the rate of travel of the base film was 0.18 cm/minute. During the experiment, travel of the base film along the anode was severely hampered by the film tending to adhere to the anode and by polyrrole depositing on the anode. The specific conductivity of the film so produced was 20 S/cm.

The examples demonstrate that in the method according to the invention the shaped article does not adhere to the electrode so that the method may be practised continuously. Failure of the shaped article to adhere to the electrode causes the method according to the invention to generate only very little waste. The method according to the invention produces, in a very short polymerisation time, a shaped article the electrically conductive polymer in which is homogeneously distributed. The applied base shaped article does not swell during wetting so that the mechanical properties of the base shaped article do not deteriorate. This allows a higher rate of production to be applied in, for instance, a continuous method.

We claim:

1. A method for the preparation of a polymeric shaped article containing an electrically conductive polymer comprising:
   providing an anode as a first electrode and a cathode as a second electrode in contact with an electrolyte-containing medium containing monomers, which on polymerization form an electrically conductive polymer;
   moving an electrically conductive base shaped article along the anode wherein at least part of the base shaped article is in contact with the anode, in the presence of the electrolyte-containing medium and applying a voltage between said anode and said second electrode whereby the monomers polymerize and form an electrically conductive polymer coating on at least a part said base-shaped article.

2. A method according to claim 1, wherein the specific conductivity of the base shaped article is greater than 0.001 S/cm.

3. A method according to claim 1, wherein the specific conductivity of the base shaped article is greater than 0.1 S/cm.

4. A method according to claim 1, wherein the base shaped article contains an electrically conductive polymer.

5. A method according to claim 4, wherein the electrically conductive polymer is selected from the group consisting of by polypyrrole, polythiophene and polyaniline.

6. A method according to claim 1, wherein the electrolyte-containing medium contains an aproptic, non-nucleophilic solvent.

7. A method according claim 1, wherein the concentration of electrolyte in the electrolyte-containing medium ranges between 0.01 and 0.1 mole per liter.

8. A method according to claim 1, wherein the electrolyte-containing medium contains monomer units selected from the group consisting of substituted or unsubstituted pyrrole, thiophene, indole, carbazole, furan, aniline, isothianaphthene and acetylene.

9. A method according to claim 1, wherein the concentration of monomer units in the electrolyte-containing medium ranges between 0.1 and 0.3 mole per liter.

10. A method according to claim 1, wherein the contact time, during which the base shaped article is contacted with the electrolyte, ranges between 0.1 and 5 minutes.

11. A method according to claim 1, wherein the current density between the anode and the cathode is 5–20 mA/cm$^2$.

12. A method according claim 1, wherein the method is continuous.

13. A method according to claim 8, wherein the substituted monomers are selected from the group consisting of 3,4-dimethyl pyrrole, 3-methoxy pyrrole, and 3,4-dimethoxy pyrrole.

14. A method according to claim 1, wherein said base shaped article is a film.

15. A continuous method for preparing an electrically conductive polyolefin film comprising:
   (a) providing an anode and a cathode in electrical contact with an electrolyte-containing medium, said medium containing monomers selected from the group consisting of substituted or unsubstituted pyrrole, thiophene, indole, carbazole, furan, aniline, isothianaphthene and acetylene, said monomers being capable of polymerizing to form at least one electrically conductive polymer;
   (b) passing a polyolefin film having electrically conductive properties through said medium wherein at least a part of said film contacts said anode and applying a voltage between said anode and said cathode whereby said monomers polymerize and form an electrically conductive polymer coating on said film.

16. A method according to claim 15, wherein the substituted monomers are selected from the group consisting of 3,4-dimethyl pyrrole, 3-methoxy pyrrole, and 3,4-dimethoxy pyrrole.

* * * * *